United States Patent [19]
Hayakawa et al.

[11] Patent Number: 5,303,087
[45] Date of Patent: Apr. 12, 1994

[54] RETROFOCUS TYPE LENS

[75] Inventors: Shingo Hayakawa, Kanagawa; Nozomu Kitagishi, Tokyo; Shouichi Yamazaki; Koutaro Yano, both of Kanagawa, all of Japan

[73] Assignee: Canon Kabushiki Kaisha, Tokyo, Japan

[21] Appl. No.: 787,822

[22] Filed: Nov. 5, 1991

[30] Foreign Application Priority Data

Nov. 8, 1990 [JP] Japan .................. 2-303006
Nov. 8, 1990 [JP] Japan .................. 2-303010

[51] Int. Cl.⁵ .................. G02N 3/02; G02N 13/04
[52] U.S. Cl. .................. 359/708; 359/716; 359/753; 359/784
[58] Field of Search .............. 359/708, 748, 749, 753, 359/784, 751-752, 716

[56] References Cited

U.S. PATENT DOCUMENTS

| | | | |
|---|---|---|---|
| 3,832,035 | 8/1974 | Takahashi | 359/749 |
| 3,926,506 | 12/1975 | Maeda | 359/751 |
| 4,008,952 | 2/1977 | Nakagawa | 359/752 |
| 4,685,774 | 8/1987 | Moskovich | 359/708 |
| 4,704,009 | 11/1987 | Yamamoto et al. | 359/782 |
| 4,957,355 | 9/1990 | Sato | 359/749 |
| 4,981,344 | 1/1991 | Ueda | 359/708 |

FOREIGN PATENT DOCUMENTS 3-145613  6/1991  Japan .

*Primary Examiner*—Bruce Y. Arnold
*Assistant Examiner*—James Phan
*Attorney, Agent, or Firm*—Fitzpatrick, Cella, Harper & Scinto

[57] ABSTRACT

A retrofocus type lens having a plurality of lenses divided into three lens units, or, in the order from a screen, a first lens unit, a second lens unit and a third lens unit, wherein letting the focal length of the entire lens system be denoted by fT, and the distance from a lens surface on the side of an original image to the original image by SK, $$SK > 0.7 \, fT$$

is satisfied, and the second lens unit and the first lens unit or the third lens unit each is provided with at least one aspherical lens of which at least one of the lens surfaces is aspherical.

16 Claims, 5 Drawing Sheets

RETROFOCUS TYPE LENS

BACKGROUND OF THE INVENTION

1. Field of the Invention

This invention relates to retrofocus type lenses and, more particularly, to a retrofocus type lens suited to a projection lens for a color liquid-crystal projection television system, in which, for example, a plurality of images having different pieces of color information are combined by using composition mirrors and then projected onto a screen in an enlarged scale.

2. Description of the Related Art

Various color liquid-crystal projection television systems of such a kind that images displayed on a plurality of color liquid-crystal display elements (liquid-crystal light bulbs) are optically superimposed and projected by a projection lens onto the screen, have been proposed.

FIG. 7 is a schematic view of the main parts of a general type of the color liquid-crystal projection television system in which the images formed in the color liquid-crystal display elements are projected onto the screen (not shown).

In FIG. 7, a white color light source 1 issues a bundle of collimated light rays. Liquid-crystal display elements 2a, 2b and 2c for red, green and blue respectively present images to be projected. Reference numerals 3a and 3b denote reflection mirrors. A red-reflection dichroic mirror 4 illuminates the liquid-crystal display element 2a for red. A green-reflection dichroic mirror 5 illuminates the liquid-crystal display element 2b for green.

The liquid-crystal display element 2c for blue is illuminated by the blue light which has passed through the red-reflection dichroic mirror 4 and the green-reflection dichroic mirror 5. Reference numeral 6 denotes a blue-reflection dichroic mirror. Reference numeral 7 denotes a projection lens.

In FIG. 7, white light issued from the light source 1 is separated into red light, green light and blue light by the dichroic mirrors 4 and 5. With the red light, green light and blue light, the liquid-crystal display elements 2a, 2b and 2c for red, green and blue are illuminated, respectively. Images formed on the liquid-crystal display elements 2a, 2b and 2c with these color rays of light are projected by the projection lens 7 in a superimposed relation on the screen (not shown) to obtain a color picture.

For the projection lens 7 employed in the above arrangement, a retrofocus type lens having a long back focal distance is frequently used in view of the necessity of disposing various kinds of optical members such as reflection mirrors and dichroic mirrors in a space between the last lens surface and the liquid-crystal display elements (corresponding to the back focal distance).

In general, the retrofocus type lens is constructed in the form comprising a lens unit of negative refractive power on the object side (the side of a conjugate point of long distance) and a lens unit of positive refractive power on the image side (the side of a conjugate point of short distance). For this reason, there is an advantage that a relatively long back focal distance is easily obtainable.

Since the lens configuration is asymmetric, however, there is a tendency to produce many asymmetric aberrations such as distortion and astigmatism.

Further, in a case where the retrofocus type lens is employed in the color liquid-crystal projection television system, because the dichroic mirrors used for color separation are disposed on the image side, in order that the color unevenness is removed to effect good reproduction of colors over the entire area of the picture frame, there is need to make an almost equal angle of incidence of the light beam on the dichroic mirror over the entire area of the picture frame. Thus, the lens system must be made almost like the so-called emergence telecentric system in which a principal light ray emerging from the image side is almost parallel to the optical axis.

However, the use of the emergence telecentric system results in the off-axial light beam entering the lens unit of positive refractive power on the image side at a high position above the optical axis. For this reason, a problem arises in that large barrel-type (negative) distortion and flare are produced so that it is very difficult to obtain a good projected image.

In Japanese Laid-Open Patent Application No. Hei 3-145613, there has been proposed a retrofocus type lens having a lens form similar to the emergence telecentric system suited to a projection lens used for the color liquid-crystal projection television system in which the above-described distortion and flare and other various aberrations are corrected by setting forth proper rules of lens design.

SUMMARY OF THE INVENTION

An object of the present invention is to further improve the retrofocus type lens, which has previously been proposed, and to provide a retrofocus type lens suited to a projection lens for the color liquid-crystal projection television system in which, while the number of lens elements is lessened, a predetermined back focal distance is obtained easily and the distortion, flare and other various aberrations are well corrected.

The retrofocus type lens according to the invention includes a first lens unit, a second lens unit and a third lens unit when counted from the side of a first conjugate point of long distance, in which, letting the focal length of the entire lens system be denoted by fT and the distance from a lens surface on the side of a second conjugate point of short distance to the second conjugate point by SK, the following condition is satisfied:

$$SK > 0.7 fT \qquad (a1)$$

and at least one aspherical lens of which at least one lens surface is aspherical is provided in each of the second lens unit and the first lens unit or the third lens unit.

DETAILED DESCRIPTION OF THE PREFERRED EMBODIMENTS

Figure 1:
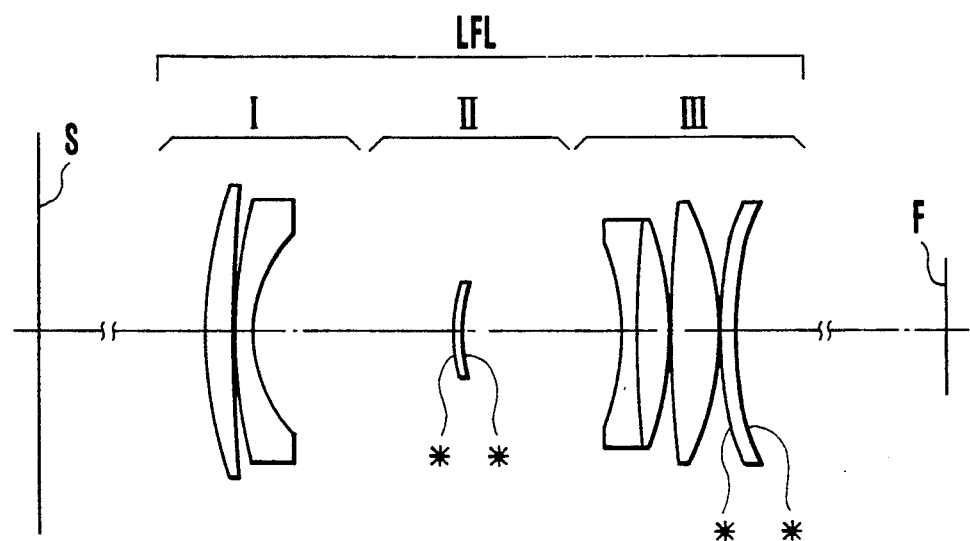
FIG. 1 is a longitudinal section view of a numerical example 1 of a lens according to the invention.
Figure 2:
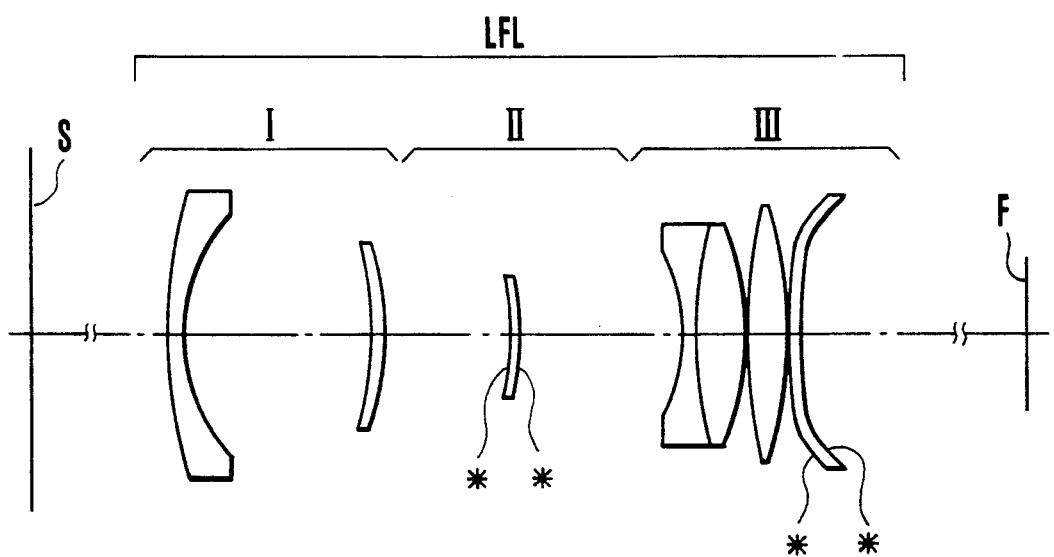
FIG. 2 is a longitudinal section view of a numerical example 2 of a lens according to the invention.

FIG. 1 and FIG. 2 are the sectional views of the numerical examples 1 and 2 of lenses according to the invention respectively, taking an example of application to the projection television system, and also showing parts of the projection television system together.

Figure 7:
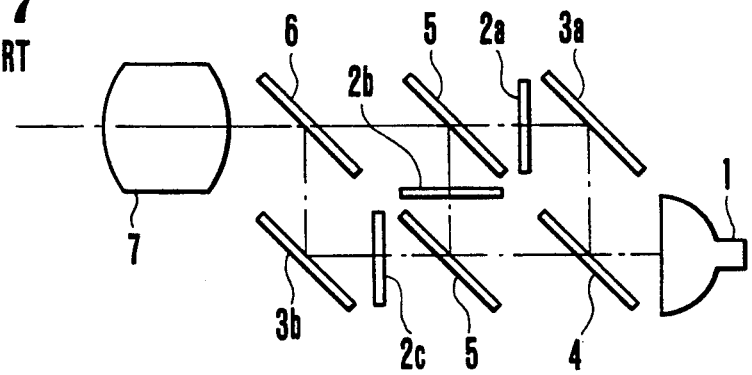
FIG. 7 is a sectional view of the conventional projection lens.

In FIG. 1 and FIG. 2, LFL denotes a retrofocus type lens according to the invention. S denotes a screen disposed on the side of a first conjugate point of long distance (hereinafter called the "object side"). F denotes a plane to be projected disposed on the side of a second conjugate point of short distance (hereinafter called the "image side"). In the image side, there are arranged various elements which, for example, in the case of the color liquid-crystal projection television system shown in FIG. 7, are liquid-crystal display elements presenting images to be projected, a light source and filters, etc. I denotes a first lens unit, II a second lens unit and III a third lens unit. It should be noted that the first lens unit has a negative refractive power. Further, the first, second and third lens units are disposed within the respective individual regions of equal length into which the total length of the retrofocus type lens is divided.

The retrofocus type lens according to the invention has its back focal distance (the distance from a lens surface on the side of the second conjunction point, i.e., the last lens surface, to the second conjunction point) SK made to be SK>0.7 fT where fT is the focal length of the entire lens system, by properly setting the refractive powers of a plurality of lenses, the lens shapes and others. In such a way, the retrofocus type lens projects images formed on the liquid-crystal display elements onto the screen S in an enlarged scale.

In addition, the second lens unit and the third lens unit each include at least one aspherical lens of which at least one lens surface is aspherical. According to this arrangement, the various aberrations such as distortion and flare are well corrected to obtain a projected picture of high optical performance. Incidentally, mark "*" in the figures denotes a lens surface which is aspherical.

Particularly, by the aspherical lens provided in the second lens unit, mainly the spherical aberration is corrected. Also, by the aspherical lens provided in the third lens unit, mainly the distortion is corrected.

Furthermore, letting the focal lengths of the aspherical lens of the second lens unit, the aspherical lens of the third lens unit and the retrofocus type lens be denoted by fAL2, fAL3 and fT, respectively, the following conditions are satisfied:

$$|fAL2| > 3fT \ldots \quad (a2)$$

$$|fAL3| > 3fT \ldots \quad (a3)$$

The conditions (a2) and (a3) have an aim to prevent shift of the focal plane and degradation of the optical performance from occurring when the refractive index of the material varies with variation of the environment such as temperature, as the aspherical lens is made from plastic or the like by molding.

In other words, by applying an aspherical surface to the lens of relatively small refractive power such as that satisfying the condition (a2) or (a3), a prescribed optical performance is maintained in such a manner that it is advantageously prevented from lowering by a change of the environment. Satisfaction of the conditions (a2) and (a3) makes it also possible to widen the range of choice of materials.

In the numerical example 1 shown in FIG. 1, the first lens unit I is constructed from a positive lens and a negative lens of meniscus shape having a convex surface facing the object side, the second lens unit II from a single aspherical lens, and the third lens unit III from a cemented lens composed of a negative lens and a positive lens, a positive lens and an aspherical lens.

Also, in the numerical example 2 shown in FIG. 2, the first lens unit I is constructed from a negative lens of meniscus shape having a convex surface facing the object side and a positive lens of meniscus shape having a convex surface facing the image side, the second lens unit II from a single aspherical lens and the third lens unit III from a cemented lens composed of a negative lens and a positive lens, a positive lens and an aspherical lens.

Next, the features of the lens design for the retrofocus type lens according to the invention are explained.

In general, in an image forming optical system, in a case where the image magnification between its two conjugate points is made sufficiently large or sufficiently small, and the distance SK between a conjugate point of short distance of the image forming optical system (referring here to that one of the two conjugate points of the image forming optical system which forms a small image, hereinafter called the "second conjugate point") and a lens surface on the side of the second conjugate point (here this distance SK is called the "back focal distance") is made sufficiently long as compared with the focal length fT of the image forming optical system, it is necessary to construct the image forming optical system in such a form that a lens or lens group having a negative refractive power is arranged on the side of a conjugate point of long distance (referring here to that one of the two conjugate points of the image forming optical system which forms a large image, hereinafter called the "first conjugate point") and a lens or lens group having a positive refractive power is arranged on the side of the second conjugate point, i.e., in the form of the so-called retrofocus type.

The retrofocus type lens is liable to produce large aberrations, particularly distortion, based on the asymmetry of the optical system, because, as has been described above, the lens or lens group having a negative refractive power and the lens or lens group having a positive refractive power are arranged in sequence. This distortion is strong in the tendency to be the extreme barrel type in the second conjugate point. This is difficult to correct well in the compact lens form using a small number of spherical lenses.

According to the invention, the entire lens system is divided into three partial systems, i.e., the first lens unit, the second lens unit and the third lens unit when counted from the object side, as the distance of the first lens surface on the object side to the last lens surface on an optical axis is divided into almost equal three parts. By using the aspherical lens in the third lens unit, mainly the above-described barrel type distortion is well corrected. Along with this, by using the aspherical lens in the central lens unit of the entire lens system, i.e., the second lens unit, mainly the spherical aberration and coma are advantageously corrected.

Figure 3:
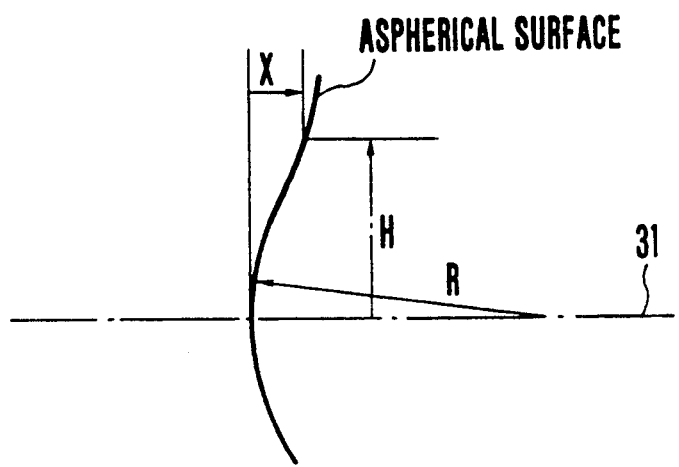
FIG. 3 is a diagram illustrating the aspherical shape.

The aspherical surface to be used in the present embodiment is expressed as shown in FIG. 3 with the shape of the aspherical surface having a paraxial radius of curvature R at the vertex of the aspherical surface, taking an X axis on the optical axis in the direction from the first conjugate point to the second conjugate point, and an H axis passing through the vertex of the aspheric surface in the direction perpendicular to the optical axis, and letting B, C and D denote the aspherical coefficients, by the following equation:

$$X = (1/R)H^2/(1+(1-(H/R)^2)^{\frac{1}{2}}) + BH^4 + CH^6 + DH^8 \quad (1)$$

In the equation (1), the first term is a term concerned with the paraxial radius of curvature R, and the second and later terms define the quantity of the aspherical surface. Also, as to the media placed before and after the aspherical surface, the refractive index of the medium of the incident side of a light beam on the aspheric surface is denoted by N and the retractive index of the medium of the emergence side is denoted by N'. At this time, the aspherical aberration coefficient $\Psi$ of third order is expressed by using the aspherical efficient B of the above-described equation (1) and the refractive indices N and N' of the media placed before and after the aspherical surface, as follows:

$$\Psi = 8(N' - N)B \quad (2)$$

(Since, in the present invention, the result described here is only necessary, what is concerned with the deduction of the equation (2) is omitted, but it is derived from the equation (3.1), equation (4.3b) and equation (4.5) in the description of "Lens Design Method" by Yoshiya Matsui (Kyoritu Publication).)

Further, the aspherical aberration coefficient $\Psi$ gives the third order aberration coefficient the amounts of variation shown below, in other words, the amounts of variation of the third order aberrations produced by using the aspherical form:

$$\begin{aligned} \Delta I &= h^4 \psi \\ \Delta II &= h^3 \bar{h} \psi \\ \Delta III &= h^2 \bar{h}^2 \psi \\ \Delta IV &= h^2 \bar{h}^2 \psi \\ \Delta V &= h \bar{h}^3 \psi \end{aligned} \quad (3)$$

where $\Delta I$ is the amount of variation of the spherical aberration coefficient, $\Delta II$ the amount of variation of the coma coefficient, $\Delta III$ the amount of variation of the astigmatism coefficient, $\Delta IV$ the amount of variation of the sagittal-curvature-of-field coefficient and $\Delta V$ the amount of variation of the distortion coefficient.

Also, h and $\bar{h}$ are the paraxial light ray tracing quanta with h representing the height (the distance from the optical axis) at which a light ray that advances along the optical axis and is to form an image on the optical axis (the paraxial on-axial light ray $l_1$) crosses each lens surface, and $\bar{h}$ representing the height at which a light ray that enters the lens from an oblique direction and passes the center of a stop SP (the pupil paraxial light ray $l_2$) crosses each lens surface.

Therefore, the height $\bar{h}$ varies depending on the position of the stop and cannot be defined in an optical system in which the stop does not exist. Hence, explanation will be made on the assumption that a virtual stop is present at the position obtained by halving the distance from the first lens surface to the last lens surface of the lens system, i.e., nearly at the center of the lens system.

In general, in the lens system, if the stop is arranged in a one-sided position to the first lens surface or the last lens surface, it becomes possible to reduce the diameter of a lens arranged near the stop. However, it becomes necessary to considerably increase the diameter of another lens which is arranged on the opposite side to that in which the stop is arranged. For this reason, in order to minimize the bulk and size of the entire lens system, it is desirable to arrange the stop at or near the center of the lens system as is assumed here.

Now, correction of the distortion of barrel type which is liable to increase largely in the retrofocus type lens, by using the aspherical surface, is considered here based on the equation (3). As is understandable from the equation (3), by using the aspherical surface, while the spherical aberration coefficient, the coma coefficient, the astigmatism coefficient and the sagittal-curvature-of-field coefficient vary in proportion to the fourth, third, second and second powers, respectively, of the height h of the cross of the paraxial on-axial light ray with each lens surface, the distortion coefficient varies in proportion to the first power of the height h. Also, while the spherical aberration coefficient, the coma coefficient, the astigmatism coefficient and the sagittal-curvature-of-field coefficient vary in proportion to the zeroth, first, second and second powers, respectively, of the height $\bar{h}$ of cross of the pupil paraxial light ray, the distortion coefficient varies in proportion to the third power of the height $\bar{h}$. To largely vary the distortion coefficient, while suppressing the spherical coefficient, the coma coefficient, the astigmatism coefficient and the sagittal-curvature-of-field coefficient to a minimum, by using the aspheric surface, therefore, it is proper to make aspherical the lens surface which has the paraxial on-axial light ray, to cross each lens surface at a small height h, and the pupil paraxial light ray to cross each lens surface at a large height $\bar{h}$.

Since, in the retrofocus type lens, as has been described above, a lens or lens group having a negative refractive power is arranged on the side of the first conjugate point of the image forming optical system, and a lens or lens group having a positive refractive power is arranged on the side of the second conjugate point, it is general that the height h of cross of the paraxial on-axial light ray with each lens surface becomes a small value in the lens surface on the side of the first conjugate point and becomes a large value in the lens surface on the side of the second conjugate point. Also, in many cases, it becomes an intermediate value between these in the neighborhood of the center of the lens system.

Meanwhile, the height $\bar{h}$ of cross of the pupil paraxial light ray with each lens surface increases generally as the distance from the position of the stop increases. In a case where, like the assumption described above, the stop is supposed to be arranged in the position obtained by halving the distance from the first lens surface to the last lens surface of the lens system, it becomes a large value in either end of the lens system and becomes a small value in the center of the lens system.

Incidentally, here, the value of the height $\bar{h}$ of cross of the pupil paraxial light ray with each lens surface has been described as the large value, or the small value. Because the value of the height $\bar{h}$ changes its sign before and after the stop, the word "large" value or "small" value means the magnitude of its absolute value.

Thus, in the present invention, in order to correct the distortion of barrel type which is liable to increase largely in the retrofocus type lens, the aspherical surface is used in the one of the lens surfaces, which has a relatively small value of the height h of cross of the paraxial on-axial light ray with each lens surface, and a relatively large value of the height $\bar{h}$ of cross of the pupil paraxial light ray with each lens surface, that is, of the three regions obtained by dividing the distance from the first lens surface to the last lens surface of the lens system to almost three equal parts, in the third lens unit lying in the region on the side of the second conjugate point.

In more detail, in the present invention, with attention on the height h of cross of the paraxial on-axial light ray with each lens surface, and with the fact in mind that the value of the height h rapidly decreases in the space from the lens or lens group having the positive refractive power arranged on the side of the second conjugate point to the second conjugate point, by arranging the aspherical lens of relatively weak refractive power that satisfies the above-described condition (a3) in the third lens unit where the distance between the paraxial on-axial light ray and the optical axis becomes relatively small and the distance between the pupil paraxial light ray and the optical axis becomes large, the distortion is corrected well.

It should be noted that the reason why the aspherical lens is made to be a lens of so weak refractive power as to satisfy the condition (a3) is that, in a case where the aspherical lens arranged there has a strong negative refractive power, it is no longer of the retrofocus type and it becomes difficult to make sufficiently long the back focal distance SK as compared with the focal length fT. Also, in the case of the lens having a strong positive refractive power, the value of the height h of cross of the above-described paraxial on-axial light ray with this aspherical surface cannot be made sufficiently small, causing the aberrations other than the distortion to vary to a large extent.

In the present invention, as has been described above, the distortion has been corrected by arranging the aspherical lens in the third lens unit, which does not largely vary each of the spherical aberration coefficient, the coma coefficient, the astigmatism coefficient and the sagittal-curvature-of-field coefficient, the amounts of variation of the spherical aberration coefficient, the coma coefficient, the astigmatism coefficient and the sagittal-curvature-of-field coefficient are not zero as indicated by the equations (3).

Also, in a retrofocus type lens using no aspherical surfaces, as a matter of course, these aberrations remain. Therefore, in the present invention, by providing an aspherical lens in the second lens unit, the remaining aberrations are advantageously corrected.

This aspherical lens in the second lens unit differs from the above-described aspherical lens for correcting the distortion in the third lens unit, and is chiefly to correct the other aberrations, namely, the spherical aberration, coma, astigmatism and sagittal curvature of field. For this reason, it is desirable to arrange it in a position where the height h of cross of the paraxial on-axial light ray with each lens surface is large and the height $\bar{h}$ of cross of the pupil paraxial light ray with each lens surface is small. On this account, in the present invention, the second aspherical surface is arranged in the second lens unit at or near the center of the lens system where although the height of the paraxial on-axial light ray is in the middle order, the height of the pupil axial light ray becomes extremely small.

Also, the aspherical lens arranged in the second lens unit, too, if made to be a lens of strong refractive power, weakens the refractive power arrangement of the retrofocus type, showing a tendency to shorten the back focal distance. Therefore, it is made to be a lens of so weak a refractive power as to satisfy the above-described condition (a2).

Also, such an arrangement has an advantage of widening the range of choice of materials. This is the same as in the case of the above-described aspherical lens in the third lens unit for correcting the distortion.

Next, further features of the invention on the shape of the aspherical lens are described. Firstly, the aspherical lens arranged in the third lens unit is assumed for the purpose of simplicity to have its two lens surfaces being infinite in the paraxial radius of curvature. Assuming further that the aspherical surface is applied to only one of the lens surfaces and moreover that as to the aspherical coefficients, a value B of the above-described equation (1) only is given. In this case, by putting R=∞, C=D=0 into the equation (1), the shape of the aspherical surface is expressed as follows:

$$X = BH^4 \tag{4}$$

In this case, the focal length fAL3 of the aspherical lens in the third lens unit results in infinity. Because the refractive power is sufficiently weak, no obstacle is laid in configuring the retrofocus type and it becomes, therefore, possible to maintain a sufficiently long back focal distance. Also, for the above-described reason, it is made possible to well correct the distortion.

On the supposition that this aspherical lens in the third lens unit is arranged on the side of the second conjugate point of the lens system, a further case where an aspherical surface is employed in the lens surface on the side of the second conjugate point will be considered.

In general, the distortion in the second conjugate point of the retrofocus type lens is of an extreme barrel type. It is, therefore, proper that the aspherical surface for correcting the distortion is given such a shape that the amount of variation $\Delta V$ of the distortion coefficient in the equations (3) becomes a negative value. In general, in the position on the side of the second conjugate point of the lens system where this aspherical lens in the third lens unit is arranged, the height h of cross of the paraxial on-axial light ray with the lens surface becomes a positive value, and the height $\bar{h}$ of cross of the pupil paraxial light ray with the lens surface, too, becomes a positive value. For this reason, to make negative the value of the amount of variation $\Delta V$ of the distortion coefficient, it becomes necessary to make negative the value of the aspherical aberration coefficient $\Psi$.

Meanwhile, the aspherical aberration coefficient $\Psi$ is expressed, by using the refractive indices N and N' of the media placed before and after the aspherical surface and the aspherical coefficient B, as the equation (2). Here, because the medium placed before the aspheric surface is an optical material such as glass or plastic, the one after is air, N>N' generally results. Therefore, in order to correct distortion of the barrel type, it is necessary here to make positive the value of the aspherical coefficient B. In this case, the shape of the aspherical surface results from the equation (4) in a curved surface of fourth degree with the convex curvature facing the second conjugate point side. The axially measured thickness of the aspherical lens increases as goes farther away from the optical axis.

Likewise, a case where an aspherical surface of the aspherical lens is used in the lens surface on the side of the first conjugate point instead of the lens surface on the side of the second conjugate point will be considered. In this case, the refractive indices N and N' of the media placed before and after the aspherical surface results in the relationship of $N<N'$. To correct the distortion of barrel type, therefore, it becomes necessary to make negative the value of the aspherical aberration coefficient $\Psi$, in other words, make negative the value of the aspherical coefficient B. In this case, the shape of the aspherical surface results from the equation (4) in a curved surface of fourth degree with the convex curvature facing the second conjugate point. The axially measured thickness of the aspherical lens increases as it goes farther away from the optical axis.

For the reason described above, to correct the distortion of barrel type by making the aspherical lens in the third lens unit so that the either one lens surface or both lens surfaces of this lens is or are aspherical, the aspherical lens is formed in such a shape that its thickness measured in the axial direction increases as farther away from the optical axis.

Further, in the aspherical lens, in the case of the lens arranged in a converging optical path on the side of the second conjugate point of the lens system, for the purpose of not deteriorating the spherical aberration and coma while maintaining the advantage particularly in correcting the distortion, it is further advantageous that the aspherical lens is formed in an almost meniscus shape having the concave surface facing the second conjugate point.

Meanwhile, the aspherical lens arranged in the second lens unit near the center of the lens system has an aim chiefly to correct the spherical aberration and coma. In the lens or lens group of positive refractive power arranged on the side of the second conjugate point of the retrofocus type lens, it is general that undercorrected spherical aberration and outward coma are liable to be produced. Even in the entire lens system, these aberrations tend to remain. The aspherical lens arranged in the second lens unit advantageously corrects these aberrations and is also used in advantageously correcting the various aberrations produced by the preceding aspherical lens arranged to correct the distortion. For this purpose, it is proper to make the amount of variation of the spherical aberration coefficient $\Delta I$ and the amount of variation of the coma $\Delta II$ to have negative values. Considering likewise the above-described aspherical shape for correcting the distortion, it is formed in such a shape that the thickness measured in the axial direction increases as farther away from the optical axis.

The aspherical shape of this aspherical lens in the second lens unit varies depending on the arrangement of the refractive powers of the other lenses and the shape of the other aspherical lens. So, there is no reason that it must always be this shape. However, to perform aberration correction in a good balance, it is desirable to make it in such a shape.

Figure 4:
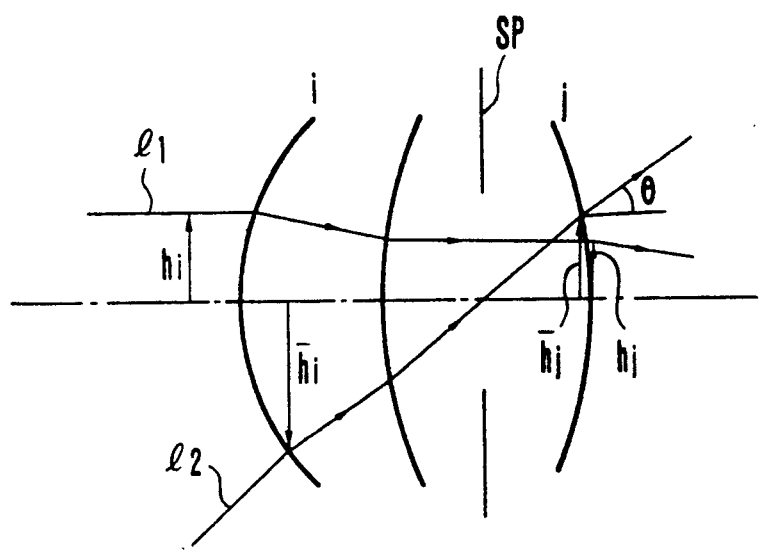
FIG. 4 is a diagram illustrating the principal light ray passing through the lens system.

Also, in the present invention, taking the center of the off-axial light beam as a principal light ray, each element is set so that the angle $\theta$ the principal light ray of the maximum off-axial light beam emerging from the lens surface on the image side makes with the optical axis, as shown in FIG. 4 becomes $\theta<20$ degrees. In other words, letting the height of emergence of the principal light ray of the maximum off-axial beam from the lens surface on the image side be denoted by h and the maximum image height on the image plane by D and the back focal distance by SK, the following condition is satisfied:

$$(D-h)/SK < 0.364$$

Accordingly, a prescribed telecentric system is obtained.

Next, numerical examples 1 and 2 of the invention are shown. In the numerical examples 1 and 2, Ri is the radius of curvature of the i-th lens surface when counted from the object side, Di is the i-th lens thickness or air separation when counted from the object side, and Ni and $\nu$i are respectively the refractive index and Abbe number of the glass of the i-th lens when counted from the object side.

Incidentally, the aspherical coefficients are expressed based on the above-described equation (1). Incidentally, all of the materials of the lenses to which the aspherical surface is applied are synthetic resin.

| Numerical Example 1 (FIGS. 1 and 5) | | | |
|---|---|---|---|
| F = 90.0 FNo = 1:4 $2\omega$ = 62.8° | | | |
| R1 = 147.40 | D1 = 9.0 | N1 = 1.78472 | $\nu$1 = 25.7 |
| R2 = 1117.99 | D2 = 0.5 | | |
| R3 = 222.16 | D3 = 5.0 | N2 = 1.71299 | $\nu$2 = 53.8 |
| R4 = 45.38 | D4 = 70.0 | | |
| R5 = 106.67 | D5 = 3.0 | N3 = 1.49171 | $\nu$3 = 57.4 |
| R6 = 106.67 | D6 = 55.0 | | |
| R7 = −98.34 | D7 = 5.0 | N4 = 1.78472 | $\nu$4 = 25.7 |
| R8 = 431.72 | D8 = 10.0 | N5 = 1.77250 | $\nu$5 = 49.6 |
| R9 = −133.00 | D9 = 0.5 | | |
| R10 = 299.99 | D10 = 17.0 | N6 = 1.71299 | $\nu$6 = 53.8 |
| R11 = −90.72 | D11 = 0.5 | | |
| R12 = 734.12 | D12 = 5.0 | N7 = 1.47171 | $\nu$7 = 57.4 |
| R13 = 734.12 | | | |
| SK = 186 | | | |
| (Aspherical Coefficients) | | | |
| | 5th Surface | | 6th Surface |
| R | 106.67 | | 106.67 |
| B | $9.314 \times 10^{-6}$ | | $1.010 \times 10^{-5}$ |
| C | $3.030 \times 10^{-9}$ | | $3.806 \times 10^{-9}$ |
| D | $1.904 \times 10^{-12}$ | | $2.835 \times 10^{-12}$ |
| | 12th Surface | | 13th Surface |
| R | 734.12 | | 734.12 |
| B | $1.946 \times 10^{-6}$ | | $2.324 \times 10^{-6}$ |
| C | $-4.265 \times 10^{-11}$ | | $9.915 \times 10^{-11}$ |
| D | $-1.258 \times 10^{-13}$ | | $-1.519 \times 10^{-13}$ |
| | fAL2 = 23400 | | fAL3 = 665000 |
| | Light Ray Effective Diameter $\phi$ 40 | | Light Ray Effective Diameter $\phi$ 90 |
| | (D-h)/SK = 0.135 | | |
| (Thickness Measured in Axial Direction) | | | |
| H | DALII | | DALIII |
| 0 | 3 | | 5 |
| 5 | 3.00050 | | 5.00024 |
| 10 | 3.00873 | | 5.00392 |
| 15 | 3.05104 | | 5.02071 |
| 20 | 3.19931 | | 5.06895 |
| 25 | | | 5.17845 |
| 30 | | | 5.39276 |
| 35 | | | 5.76980 |
| 40 | | | 6.37873 |
| 45 | | | 7.29103 |

-continued

Numerical Example 2 (FIGS. 2 and 6)
F = 90.0　FNo = 1:4　2ω = 62.8°

| | | |
|---|---|---|
| R1 = 203.27 | D1 = 5.0 | N1 = 1.71299　ν1 = 53.8 |
| R2 = 59.45 | D2 = 65.0 | |
| R3 = −139.45 | D3 = 5.0 | N2 = 1.80518　ν2 = 25.4 |
| R4 = −84.91 | D4 = 43.0 | |
| R5 = −146.29 | D5 = 3.0 | N3 = 1.49171　ν3 = 57.4 |
| R6 = −146.29 | D6 = 55.0 | |
| R7 = −69.93 | D7 = 5.0 | N4 = 1.72825　ν4 = 28.5 |
| R8 = 197.91 | D8 = 16.0 | N5 = 1.65844　ν5 = 50.9 |
| R9 = −84.28 | D9 = 0.5 | |
| R10 = 211.75 | D10 = 14.0 | N6 = 1.69680　ν6 = 55.5 |
| R11 = −148.66 | D11 = 0.5 | |
| R12 = −474.26 | D12 = 5.0 | N7 = 1.49171　ν7 = 57.4 |
| R13 = −474.26 | | |

SK = 186

(Aspherical Coefficients)

| | 5th Surface | 6th Surface |
|---|---|---|
| R | −146.29 | −146.29 |
| B | −1.952 × 10⁻⁶ | −1.718 × 10⁻⁶ |
| C | 6.801 × 10⁻¹⁰ | 5.731 × 10⁻¹⁰ |
| D | 2.532 × 10⁻¹² | 2.545 × 10⁻¹² |
| | 12th Surface | 13th Surface |
| R | −474.26 | −474.26 |
| B | 3.424 × 10⁻⁶ | 3.659 × 10⁻⁶ |
| C | −1.292 × 10⁻¹¹ | 1.542 × 10⁻¹⁰ |
| D | 1.899 × 10⁻¹⁶ | 3.078 × 10⁻¹⁴ |
| | fAL2 = 44000 | fAL3 = 278000 |
| | Light Ray Effective Diameter φ 40 | Light Ray Effective Diameter φ 90 |

(D-h)/SK = 0.146

(Thickness Measured in Axial Direction)

| H | DALII | DALIII |
|---|---|---|
| 0 | 3 | 5 |
| 5 | 3.00015 | 5.00015 |
| 10 | 3.00224 | 5.00252 |
| 15 | 3.01068 | 5.01390 |
| 20 | 3.03097 | 5.04914 |
| 25 | | 5.13743 |
| 30 | | 5.33259 |
| 35 | | 5.72942 |
| 40 | | 6.48784 |
| 45 | | 7.86789 |

In the numerical example 1, the focal lengths of the aspherical lens defined by the fifth surface (R5) and the sixth surface (R6) in the second lens unit and of the aspherical lens defined by the twelfth surface (R12) and the thirteenth surface (R13) in the third lens unit are respectively about fAL2=23,400 and fAL3=665,000, being sufficiently large as compared with the focal length f=90 of the entire lens system. Further, the light ray effective diameters of the aspherical lens in the second lens unit and of the aspherical lens in the third lens unit are respectively 40 and 90. In these zones, the thickness of the aspherical lens measured in the axial direction increases as farther away from the optical axis, as has been described above.

Figure 5:
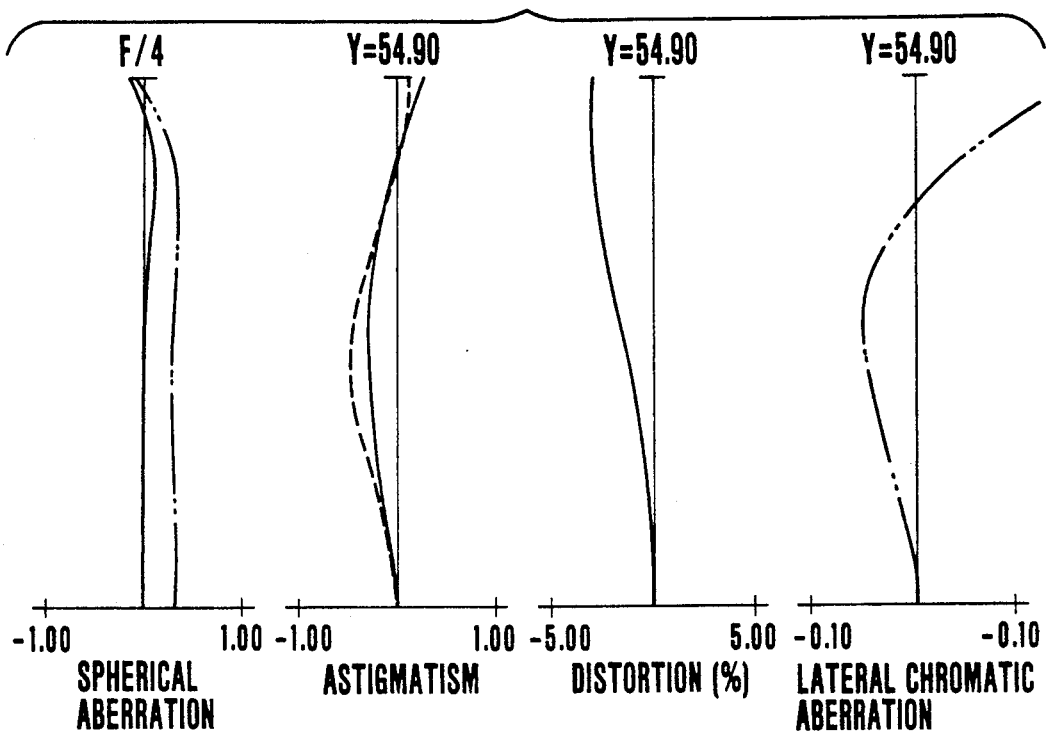
FIG. 5 shows graphs of the aberrations of the numerical example 1.

FIG. 5 shows graphs of the aberrations of the numerical example 1 with the distance of 3,000 from the first conjugate point to the first lens surface and the back focal distance SK=186.

In the numerical example 2, the focal lengths of the aspherical lens defined by the fifth surface (R5) and the sixth surface (R6) in the second lens unit and of the aspherical lens defined by the twelfth surface (R12) and the thirteenth surface (R13) in the third lens unit are respectively about fAL2=44,000 and fAL3=278,000, being sufficiently large as compared with the focal length f=90 of the entire lens system. Also, the light ray effective diameters of the aspherical lens in the second lens unit and the aspherical lens in the third lens unit are respectively about 40 and 90. In these zones, the thickness of the aspherical lens measured in the axial direction increases as it moves farther away from the optical axis, as has been described above.

Figure 6:
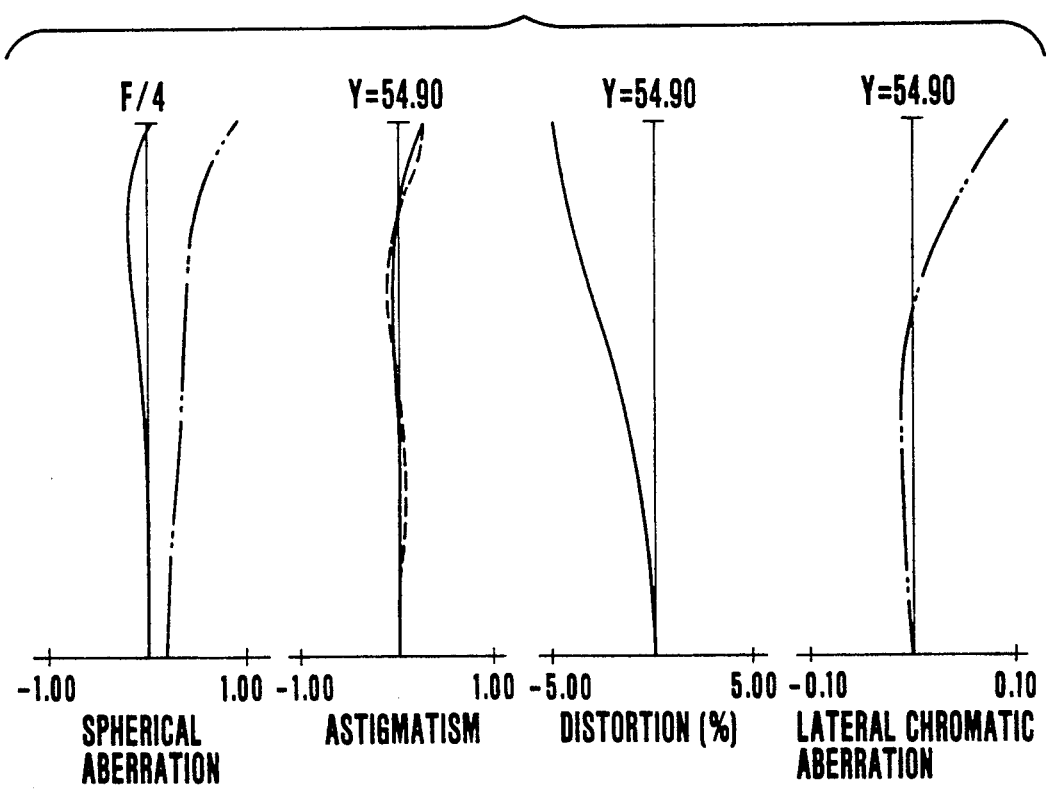
FIG. 6 shows graphs of the aberrations of the numerical example 2.

FIG. 6 shows graphs of the aberrations of the numerical example 2 with the distance of 3,000 from the first conjugate point to the first lens surface and the back focal distance SK=186.

In the numerical examples 1 and 2, the retrofocus type is of the sufficiently long back focal distance SK as compared with the focal length fT. Although the lens has a compact form, the various aberrations beginning with the distortion are corrected well as shown in FIG. 5 and FIG. 6.

Figure 8:
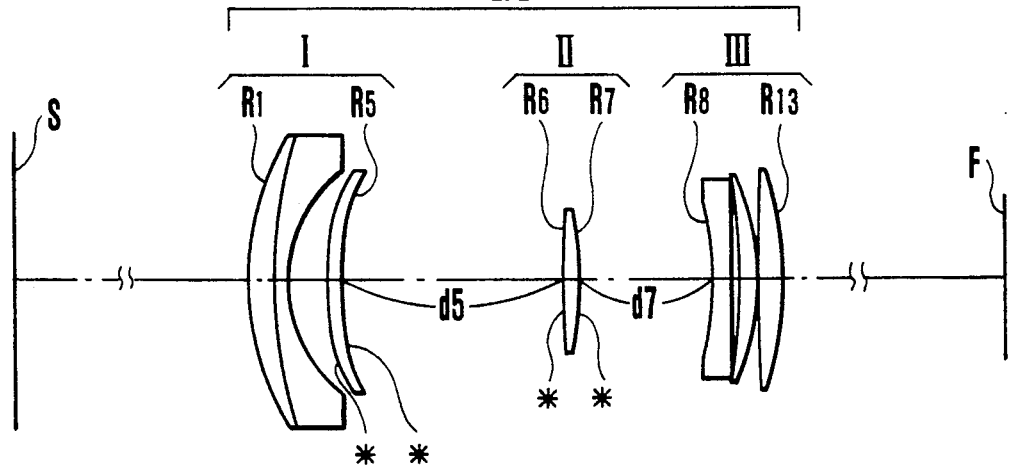
FIG. 8 is a longitudinal section view of a numerical example 3 of a lens.
Figure 9:
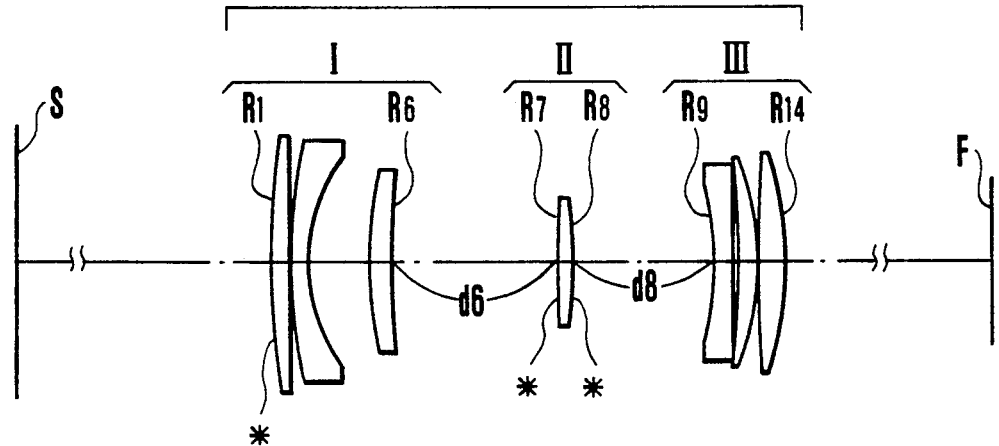
FIG. 9 is a longitudinal section view of a numerical example 4 of a lens.

In the foregoing embodiment, the practical examples of application of the aspherical surface to the second and third lens units have been described. In the following embodiment, practical examples of application of the aspherical surface to the second lens unit and the first lens unit as shown in FIGS. 8 and 9 are described.

In this embodiment, at least one aspherical lens of which at least one lens surface is aspherical is arranged in each of the first lens unit and the second lens unit. By this arrangement, distortion, flare and other various aberrations are corrected well to obtain a projected picture of high optical performance.

Particularly, by the aspherical lens provided in the first lens unit, mainly off-axial aberrations such as the distortion and flare are corrected. Also, by the aspherical lens provided in the second lens unit, mainly astigmatism and coma are corrected.

Letting the focal lengths of the aspherical lenses in the first lens unit and the second lens unit be denoted by fAL1 and fAL2, respectively, the following conditions are satisfied:

$$|fAL1| > 3fT$$

$$|fAL2| > 3fT$$

These conditions are set forth to prevent focus shift and a lowering of the optical performance as the refractive index of the material varies with variation of the environment such as temperature as the aspherical lens is made from, for example, plastic by molding.

In other words, by applying the aspherical surface to the lens of relatively small refractive power such as that satisfying this condition, a prescribed optical performance is maintained in such a manner that the lowering of the optical performance due to the environment change is advantageously prevented from occurring.

In the present embodiment, in order to maintain the long back focal distance SK and to achieve a compact lens system, letting the focal length of the first lens unit be denoted by $f_1$ and the focal length of a composite lens of the second lens unit and the third lens unit (hereinafter also called the "rear" lens unit) by $f_{23}$, the following inequalities are satisfied:

$$f_1 < 0;\ f_{23} > 0 \tag{5}$$

In this case, letting the principal point interval between the first lens unit and the rear lens unit be denoted by e, the back focal distance SK of the thin lens system becomes as follows:

$$SK = (1 - e/f_1) \cdot f_{23} \tag{6}$$

In the present embodiment, in order to achieve a lens system of the long back focal distance SK and in the compact form (that is, the principal point interval e is small), it is proper that the absolute value $|f_1|$ of the focal length of the first lens unit be as short as possible. However, when the value of $|f_1|$ is too small, large distortion of barrel type comes to be produced from the first lens unit and astigmatism also comes to be produced on the over-corrected side so that the good optical performance becomes difficult to maintain.

So, in the present embodiment, letting the focal length of the entire lens system be denoted by fT, the following inequalities are satisfied:

$$0.5 < |f_1/fT| < 2.0 \quad (7)$$

Also, in order to maintain the long back focal distance SK and to achieve the compact lens system, similar to the absolute value $|f_1|$ of the foal length of the first lens unit, letting the focal length of the third lens unit be denoted by $f_3$, the following inequality is satisfied:

$$f_3 > 0 \quad (8)$$

In the retrofocus type lens satisfying this inequality, the shorter the focal length $f_3$, the easier the lens system whose back focal distance is long and which is compact can be achieved. However, when the focal length $f_3$ is too short, the third lens unit produces large under-corrected spherical aberration on the image side and it becomes difficult to correct. This spherical aberration produced by the third lens unit is well corrected by arranging at least one aspherical lens in the second lens unit, as has been described above.

Further, to correct the distortion of barrel type and the over-corrected astigmatism by using the aspherical surface in the first lens unit on one hand, and to well correct the spherical aberration by using the aspherical surface in the second lens unit on the other hand, it is desirable in the actual practice to set each aspherical surface as follows:

That is, the above-described first lens unit has an aspherical lens whose both lens surfaces are aspherical, the above-described second lens unit, too, has an aspherical lens whose in both lens surfaces are aspherical, and, letting the aspherical coefficients of fourth order of the aspherical surfaces on the side of the first conjugate point and on the side of the second conjugate point of the aspherical lens in the first lens unit be denoted by BAL11 and BAL12 respectively, and the aspherical coefficients of fourth order of the aspherical surfaces on the side of the first conjugate point and on the side of the second conjugate point of the aspherical lens in the second lens unit by BAL21 and BAL22 respectively, the following conditions are satisfied:

$$BAL12 < BAL11 \quad (9)$$

$$BAL21 < BAL22 \quad (10)$$

Alternatively, the above-described first lens unit has an aspherical lens having an aspherical surface on the side of the first conjugate point, the above-described second lens unit has an aspherical lens whose both lens surfaces are aspherical, and, letting the aspherical coefficient of fourth order of the aspherical surface on the side of the first conjugate point of the aspherical lens in the first lens unit be denoted by BAL11, and the aspherical coefficients of fourth order of the aspherical surfaces on the side of the first conjugate point and on the side of the second conjugate point of the aspherical lens in the second lens unit be denoted by BAL21 and BAL22 respectively, the following conditions are satisfied:

$$0 < BAL11 \quad (11)$$

$$BAL21 < BAL22 \quad (12)$$

In addition, in the present invention, to obtain good optical performance over the entire area of the picture frame, it is proper to construct the first lens unit, from the object side, from a positive lens of meniscus shape having a convex surface facing the object side, a negative lens of meniscus shape having a convex surface facing the object side and a positive lens, totaling three lenses, the second lens unit from a positive lens, totaling one lens, and the third lens unit from a negative lens, a positive lens of meniscus shape having a convex surface facing the image side and a positive lens, totaling three lenses.

Also, as has been described above, in the present invention, taking the center of the off-axial light beam as the principal light ray, each element is set so that the angle $\theta$ the principal right ray of the maximum off-axial light beam emerging from the lens surface on the image side makes with the optical axis becomes $\theta < 20$ degrees. In other words, letting the height of emergence of the principal light ray of the maximum off-axial light beam from the lens surface on the image side be denoted by h and the maximum image height on the image plane by D and the back focal distance by SK, the following condition is satisfied:

$$(D-h)/SK < 0.364 \quad (13)$$

By this arrangement, a prescribed telecentric system is obtained.

Next, numerical examples 3 and 4 of the invention are shown.

Incidentally, the aspherical coefficients are expressed based on the above-described equation (1).

Also, the relationship of the above-described conditions and the numerical examples 3 and 4 is shown in Table-1.

Figure 10:
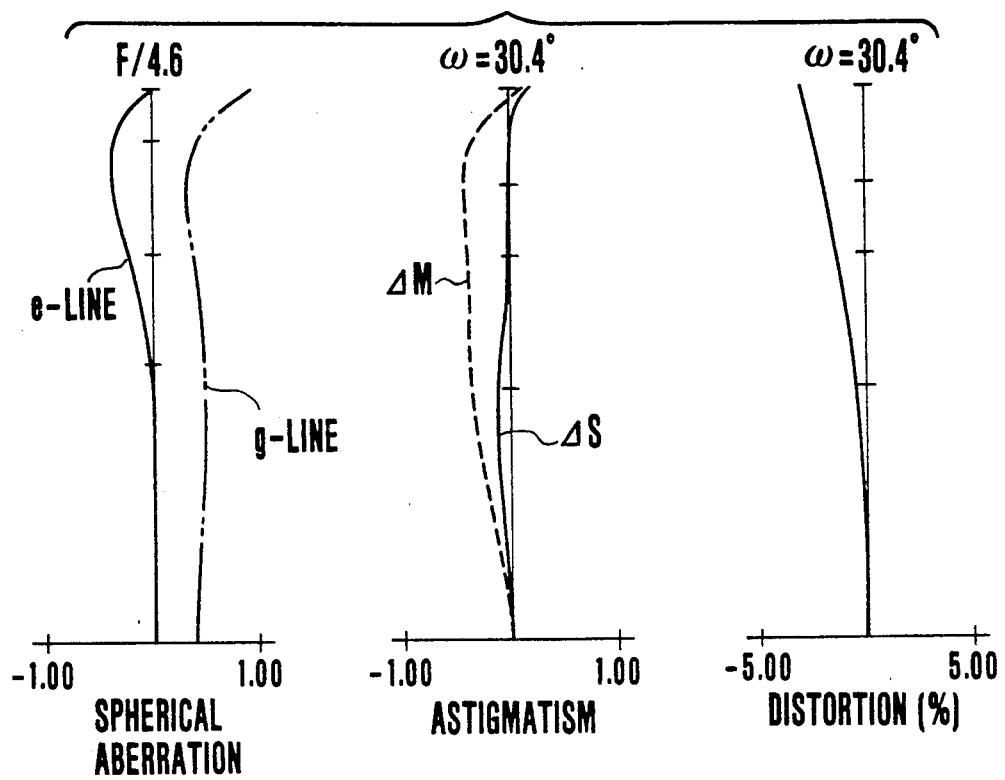
FIG. 10 shows graphs of the aberrations of the numerical example 3.

| Numerical Example 3 (FIGS. 8 and 10): | | | |
|---|---|---|---|
| F = 92.7 | FNo = 1:4.6 | 2ω = 60.9° | |
| R1 = 71.15 | D1 = 5.37 | N1 = 1.79191 | ν1 = 25.7 |
| R2 = 119.83 | D2 = 4.00 | N2 = 1.69979 | ν2 = 55.5 |
| R3 = 34.72 | D3 = 9.88 | | |
| R4 = 134.42 | D4 = 4.00 | N3 = 1.49375 | ν3 = 57.4 |
| R5 = 145.30 | D5 = 57.75 | | |
| R6 = 1913.49 | D6 = 3.00 | N4 = 1.49375 | ν4 = 57.4 |
| R7 = −664.75 | D7 = 35.46 | | |
| R8 = −85.98 | D8 = 5.00 | N5 = 1.81265 | ν5 = 25.4 |
| R9 = −1914.43 | D9 = 0.61 | | |
| R10 = −419.57 | D10 = 5.84 | N6 = 1.69979 | ν6 = 55.5 |
| R11 = −62.30 | D11 = 0.20 | | |
| R12 = −7065.46 | D12 = 5.41 | N7 = 1.69979 | ν7 = 55.5 |
| R13 = −91.27 | | | |
| Aspherical Coefficients | | | |
| R4 Surface | B4 = 6.445 × 10$^{-6}$ | | C4 = 2.324 × 10$^{-9}$ |
| | D4 = −3.611 × 10$^{-12}$ | | E4 = 2.252 × 10$^{-15}$ |
| R5 Surface | B5 = 5.658 × 10$^{-6}$ | | C5 = 2.678 × 10$^{-9}$ |
| | D5 = −5.922 × 10$^{-12}$ | | E5 = 2.697 × 10$^{-15}$ |
| R6 Surface | B6 = −2.923 × 10$^{-7}$ | | C6 = 7.218 × 10$^{-9}$ |
| | D6 = −1.465 × 10$^{-11}$ | | E6 = −2.667 × 10$^{-14}$ |

-continued

| | | | |
|---|---|---|---|
| R7 Surface | $B7 = 4.681 \times 10^{-7}$ | $C7 = 6.221 \times 10^{-9}$ | |
| | $D7 = -1.444 \times 10^{-11}$ | $E7 = -1.708 \times 10^{-14}$ | |

Figure 11:
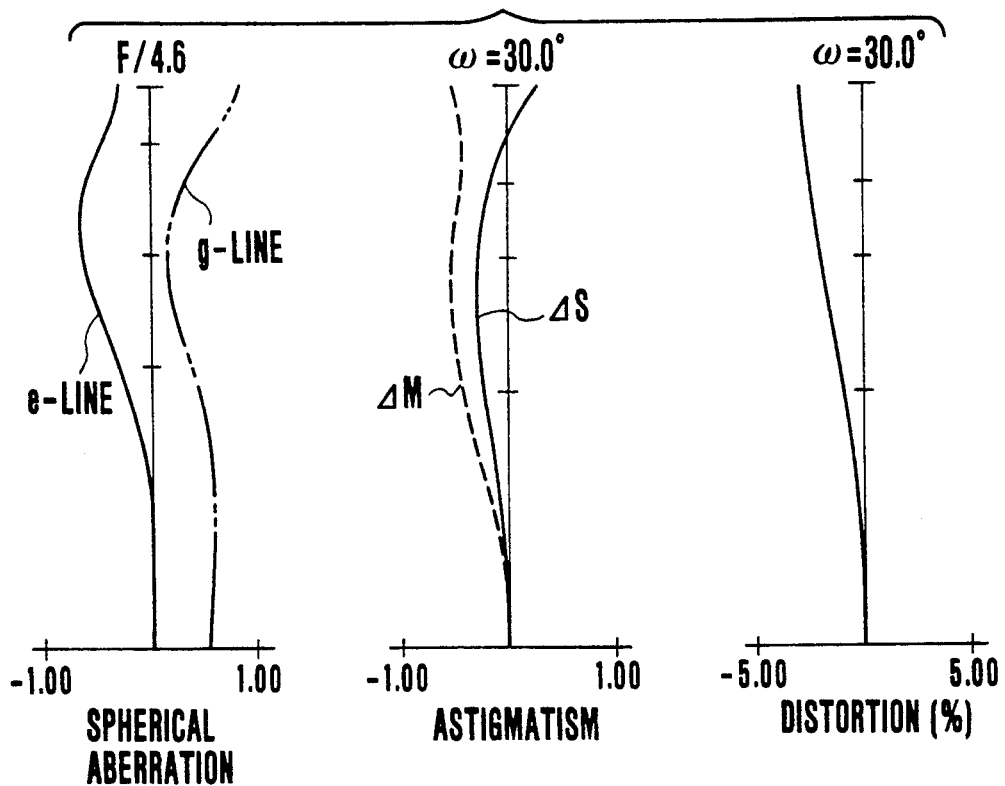
FIG. 11 shows graphs of the aberrations of the numerical example 4.

Numerical Example 4 (FIGS. 9 and 11):

$F = 94.4 \quad FNo = 1:4.6 \quad 2\omega = 60.0°$

| | | | |
|---|---|---|---|
| R1 = 406.18 | D1 = 4.00 | N1 = 1.49375 | ν1 = 57.4 |
| R2 = 2292.66 | D2 = 0.20 | | |
| R3 = 170.63 | D3 = 4.00 | N2 = 1.77621 | ν2 = 49.6 |
| R4 = 39.16 | D4 = 15.59 | | |
| R5 = 102.20 | D5 = 6.70 | N3 = 1.85501 | ν3 = 23.9 |
| R6 = 352.35 | D6 = 44.14 | | |
| R7 = −1322.39 | D7 = 3.00 | N4 = 1.49375 | ν4 = 57.4 |
| R8 = −456.88 | D8 = 36.53 | | |
| R9 = −86.71 | D9 = 5.00 | N5 = 1.81265 | ν5 = 25.4 |
| R10 = 794.36 | D10 = 0.99 | | |
| R11 = −497.15 | D11 = 5.53 | N6 = 1.69979 | ν6 = 55.5 |
| R12 = −66.25 | D12 = 0.20 | | |
| R13 = 394.22 | D13 = 6.33 | N7 = 1.69979 | ν7 = 55.5 |
| R14 = −99.92 | | | |

Aspherical Coefficients

| | | |
|---|---|---|
| R1 Surface | $B1 = 9.549 \times 10^{-7}$ | $C1 = -2.138 \times 10^{-10}$ |
| | $D1 = 2.870 \times 10^{-14}$ | $E1 = 7.951 \times 10^{-18}$ |
| R7 Surface | $B7 = 2.375 \times 10^{-7}$ | $C7 = -3.144 \times 10^{-10}$ |
| | $D7 = -4.585 \times 10^{-11}$ | $E7 = 1.248 \times 10^{-13}$ |
| R8 Surface | $B8 = 3.988 \times 10^{-7}$ | $C8 = -3.102 \times 10^{-9}$ |
| | $D8 = -2.801 \times 10^{-11}$ | $E8 = 9.074 \times 10^{-14}$ |

TABLE 1

| | Numerical Example | |
|---|---|---|
| Condition | 3 | 4 |
| SK/fT | 2.00 | 1.96 |
| \|fAL1\|/fT | 34.95 | 10.59 |
| \|fAL2\|/fT | 10.78 | 14.96 |
| BAL11 | $6.445 \times 10^{-6}$ | $9.549 \times 10^{-7}$ |
| BAL12 | $5.658 \times 10^{-6}$ | 0 |
| BAL21 | $-2.923 \times 10^{-7}$ | $2.375 \times 10^{-7}$ |
| BAL22 | $4.681 \times 10^{-7}$ | $3.988 \times 10^{-7}$ |
| (D-h)/SK | 0.19 | 0.19 |

According to the invention, by setting forth the rules of lens design as has been described above, a retrofocus type lens which is advantageously corrected for distortion, flare and other various aberrations by a relatively small number of lens elements to get a high optical performance and has a long back focal distance suited to a projection lens for the color liquid-crystal projection television system can be achieved.

Also, according to the invention, by setting forth the range for the aspherical lens as has been described above, a retrofocus type lens which has advantages both of effectively preventing the image plane from shifting by the temperature change as a constituent mold lens of plastic such as acrylic resin is used and of achieving a minimization of the weight of the entire lens system, can be achieved.

We claim:

1. A retrofocus type lens with the total length of said retrofocus type lens divided into three substantially equal regions, said retrofocus type lens comprising:
   a first lens unit lying in the region on the side of a first conjugate point of long distance, a second lens unit lying in the intermediate region and a third lens unit lying in the region on the side of a second conjugate point of short distance,
   wherein at least said second lens unit and one of said first and third lens units each include an aspherical lens, and, letting the distance from a lens surface on the side of the second conjugate point of said third lens unit to the second conjugate point be denoted by SK and the focal length of said retrofocus type lens be denoted by fT, the following condition is satisfied:

$$SK > 0.7fT.$$

2. A retrofocus type lens according to claim 1, satisfying the following condition:

$$|fAL2| > fT$$

where fAL2 is the focal length of the aspherical lens of said second lens unit.

3. A retrofocus type lens according to claim 2, wherein a material of the aspherical lens of said second lens unit comprises synthetic resin.

4. A retrofocus type lens according to claim 1, wherein said third lens unit has an aspherical lens and, letting the focal length of the aspherical lens of said third lens unit be denoted by fAL3, the following condition is satisfied:

$$|fAL3| > 3fT$$

5. A retrofocus type lens according to claim 4, wherein a material of the aspherical lens of said third lens unit comprises synthetic resin.

6. A retrofocus type lens according to claim 1, wherein said first lens unit has an aspherical lens and letting the focal length of the aspherical lens of said first lens unit be denoted by fAL1, the following condition is satisfied:

$$|fAL1| > 3fT$$

7. A retrofocus type lens according to claim 6, wherein a material of the aspherical lens of said first lens unit comprises synthetic resin.

8. A retrofocus type lens according to claim 1, wherein an angle θ made by a principal light ray of a maximum off-axial light beam emerging from a lens surface of said third lens unit and an optical axis is in a condition of θ < 20 degrees.

9. A retrofocus type lens with the total length of said retrofocus type lens divided into three substantially equal regions, said retrofocus type lens comprising:
   a first lens unit lying in the region on the side of a first conjugate point of long distance, a second lens unit lying in the intermediate region and third lens unit lying in the region on the side of a second conjugate point of short distance,
   wherein at least said second lens unit and one of said first and third lens units each include an aspherical lens and, letting the focal length of the aspherical lens of said second lens unit be denoted by fAL2 and the focal length of said retrofocus type lens be denoted by fT, the following condition is satisfied:

$$|fAL2| > 3fT$$

10. A retrofocus type lens according to claim 9, satisfying the following condition:

$$SK > 0.7fT$$

where SK is the distance from a lens surface on the side of the second conjugate point of said third lens unit to the second conjugate point.

11. A retrofocus type lens according to claim 10, wherein a material of the aspherical lens of said second lens unit comprises synthetic resin.

12. A retrofocus type lens according to claim 3, wherein said third lens unit has an aspherical lens and, letting the focal length of the aspherical lens of said third lens unit be denoted by fAL3, the following condition is satisfied:

$|fAL3| > 3fT$

13. A retrofocus type lens according to claim 12, wherein a material of the aspherical lens of said third lens unit comprises synthetic resin.

14. A retrofocus type lens according to claim 9, wherein said first lens unit has an aspherical lens and, letting the focal length of the aspherical lens of said first lens unit be denoted by fAL1, the following condition is satisfied:

$|fAL1| > 3fT$

15. A retrofocus type lens according to claim 14, wherein a material of the aspherical lens of said first lens unit comprises synthetic resin.

16. A retrofocus type lens according to claim 9, wherein an angle $\theta$ made by a principal light ray of a maximum off-axial light beam emerging from a lens surface of said third lens unit and an optical axis is in a condition of $\theta < 20$ degrees.

* * * * *

UNITED STATES PATENT AND TRADEMARK OFFICE
CERTIFICATE OF CORRECTION

PATENT NO. : 5,303,087
DATED : April 12, 1994
INVENTOR(S) : Shingo Hayakawa, et al It is certified that error appears in the above-indentified patent and that said Letters Patent is hereby corrected as shown below:

COLUMN 9
    Line 6, "as goes" should read --as the lens extends--; and
    Line 59, "as" should read --as the lens extends--.

COLUMN 13
    Line 18, "foal" should read --focal--; and
    Line 45, "in" should be deleted.

COLUMN 16
    Line 48, "and" should read --and a--.

Signed and Sealed this

Fourth Day of October, 1994

Attest:

BRUCE LEHMAN

*Attesting Officer*      *Commissioner of Patents and Trademarks*